United States Patent [19]

Farr

[11] 4,435,960
[45] Mar. 13, 1984

[54] HYDRAULIC POWER BOOSTERS FOR VEHICLE HYDRAULIC SYSTEMS

[75] Inventor: Glyn P. R. Farr, Warwickshire, England

[73] Assignee: Lucas Industries Limited, Birmingham, England

[21] Appl. No.: 221,260

[22] Filed: Dec. 30, 1980

[30] Foreign Application Priority Data

Jan. 3, 1980 [GB] United Kingdom ............... 8000200
Feb. 20, 1980 [GB] United Kingdom ............... 8005727

[51] Int. Cl.³ ........................................... B60T 13/00
[52] U.S. Cl. ..................................... 60/547.1; 91/416
[58] Field of Search ............. 91/47, 417 R; 60/547 R, 60/548, 581; 91/49, 416

[56] References Cited

U.S. PATENT DOCUMENTS

| 3,257,810 | 6/1966 | Hänni | 91/417 R |
| 4,072,085 | 2/1978 | Soupal | 60/548 |
| 4,075,848 | 2/1978 | Ueda | 60/548 |
| 4,244,185 | 1/1981 | Belart | 60/581 |
| 4,263,784 | 4/1981 | Steffes | 60/581 |
| 4,317,332 | 3/1982 | Schubert | 91/417 R |

FOREIGN PATENT DOCUMENTS

| 606203 | 10/1960 | Canada | 60/548 |
| 606206 | 10/1960 | Canada | 60/548 |

*Primary Examiner*—Abraham Hershkovitz
*Attorney, Agent, or Firm*—Scrivener, Clarke, Scrivener and Johnson

[57] ABSTRACT

In an hydraulic power booster a boost piston working in a bore in a housing is of stepped outline having at least three axially spaced portions of at least two different diameters. The two end portions carry seals having slidable sealing engagements with complementary portions of the bore, and a stationary seal is fixed in the housing. An intermediate portion of the piston disposed between the end portions and of smallest diameter has a slidable engagement in the stationary seal.

6 Claims, 4 Drawing Figures

HYDRAULIC POWER BOOSTERS FOR VEHICLE HYDRAULIC SYSTEMS

This invention relates to pedal-operated hydraulic power boosters for vehicle hydraulic systems of the kind comprising a boost piston adapted to actuate a master cylinder assembly and working in a bore in a housing, a first high pressure chamber defined in the housing through which hydraulic pressure is applied to the boost piston, a second high pressure chamber with an inlet port for connection to a source of high pressure hydraulic fluid, and a reservoir chamber with an exhaust port for connection to a reservoir for hydraulic fluid also defined in the housing, in which communication between the two high pressure chambers and between the first high pressure chamber and the reservoir chamber is controlled by a control valve responsive to an effort applied to the pedal.

It is desirable to make boosters, and the combined booster and master cylinder assembly, as short as possible axially, since this reduces the amount of installation space required, and also reduces the material cost and weight.

In some known boosters, particularly vacuum-operated boosters, this is achieved by making the booster and the master cylinder overhung. A booster is said to be overhung when a substantial portion of the stroke length of the input piston, or the boost piston, is located outside the housing. This has the advantage that less space in an axial direction is required since, for any given pedal stroke, the end of the housing which forms the forward limit for that stroke is disposed relatively further forward. A master cylinder is said to be overhung when it is partially recessed into the forward end of the booster.

According to our invention in an hydraulic power booster of the kind set forth the piston is of stepped outline having at least two axially spaced portions of different diameters of which one of the portions which is of greater diameter carries a seal having a slidable sealing engagement with a complementary portion of the bore, and the other portion of the piston which is of smaller diameter has a slidable sealing engagement in a seal in the housing, the seal in the housing being disposed in advance of the seal carried by the piston.

Preferably the boost piston has at least three axially spaced portions of at least two different diameters of which two end portions carry seals having slidable sealing engagements with complementary portions of the bore, and the said other portion which has a slidable sealing engagement in the seal in the housing is of smallest diameter.

Conveniently the three chambers are so constructed and arranged in the housing, between the bore and the boost piston, that in an inoperative position with the source of hydraulic fluid operative the high pressure fluid acts over a first region of the piston to subject it to a force urging it into a retracted position and in an operative position the high pressure fluid acts over a second region of the piston to subject it to a force urging it in an operative, brake-applying, direction.

Each region may comprise a face on the piston at a change in diameter. Alternatively it may be constituted by the difference in areas between oppositely arranged faces of different areas on the piston which are subjected to equal pressures.

The provision of the stepped piston makes the booster substantially short axially.

Some embodiments of our invention are illustrated in the accompanying drawings in which.

Figure 1:
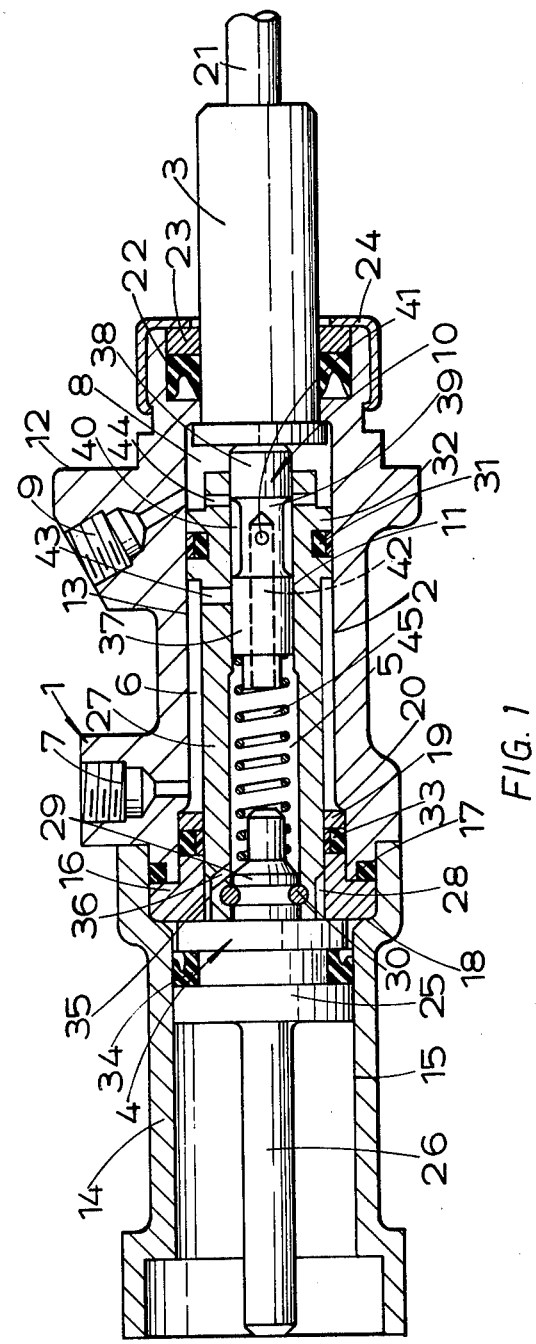
FIG. 1 is a longitudinal section through an hydraulic power booster.

The hydraulic power booster illustrated in FIG. 1 of the drawings comprises a housing 1 having a bore 2 in which an input piston 3 and a boost piston 4 both work, a boost chamber 5 being provided through which hydraulic pressure is applied to the boost piston 4 to actuate a master cylinder assembly (not shown). A high pressure chamber 6 connected by an inlet port 7 to a source of high pressure hydraulic fluid such as an accumulator (not shown), and a reservoir chamber 8 connected by an exhaust port 9 to a reservoir for hydraulic fluid (not shown) are also located in the housing 1. Communication between the high pressure chamber 6 and the boost chamber 5, and between the boost chamber 5 and the reservoir chamber 8 is controlled by a control valve 10 working in a bore 11 in the boost piston 4 in response to an effort applied to the input piston 3.

The housing 1 has, a first part 12 being provided with a stepped axial bore 13, and a second part 14 having a stepped axial bore 15. The housing 1 also incorporates an annular plug 16 which is retained between shoulders 17, 18 at steps in the bores 13, 15 respectively and a ring 19 is located against a shoulder 20 at a step in the bore 13. A seal 33 is located between the plug 16 and the ring 19.

A pedal-operated input rod 21 acts on the input piston 3 which works in the bore 13 through a stationary seal 22. The seal 22 is retained in the housing part 12 by a ring 23 and an annular retainer 24 disposed on the outside of the housing 12.

The boost piston 4 works in the bore 2 forward of the input piston 3, and comprises two portions. An output portion 25 works in the bore 15 and has an integral output rod 26 for actuating the master cylinder, which may be overhung, since the fluid chambers are disposed rearwardly of the output rod 26. A second control portion 27 of generally smaller diameter extends rearwardly into, and works in the bore 13 and a bore 28 in the annular plug 16. The control portion 27 is provided with the through bore 11, into the forward end of which an extension 29 of reduced diameter of the output portion 25 projects, and couples the two portions by a snap ring 30, or other suitable coupling. The control portion 27 is of stepped outline to define the reservoir chamber 8, the high pressure chamber 6, and the boost chamber 5. The reservoir chamber 8 is defined at the rear end of the bore 2 between the seal 22 for the input piston 3 and a seal 31 on a portion 32 of the control portion 27 which is of greatest diameter. The high pressure chamber 6 is defined between the seal 31 and the stationary seal 33. The seals 31 and 33 are low friction seals, preferably comprising polyetrafluoroethylene (PTFE) rings loaded by seals of elastomeric material, and are arranged to seal portions of the boost piston 4. The boost chamber 5 is defined between a seal 34 on the output portion 25 of the boost piston 4 and the control valve 10, and is formed by the bore 11 and an annular chamber 35 between the plug 16 and the seal 34, the chamber 35 being connected to the bore 11 by an inclined drilling 36 through the control portion 27 of the boost piston 4. Since the seals 31 and 33 are smaller than the seal 34 their contribution to the hysteresis is less than it would have been had the three seals been of equal size.

The control valve 10 comprises a spool of stepped outline, having spaced lands 37, 38 connected by a stem 39 of reduced diameter, which defines an annular chamber 40 in communication with the boost chamber 5 through a radial port 41 and a blind bore 42 in the spool. The land 37 acts as an inlet valve, controlling communication between the high pressure chamber 6 and the annular chamber 40 by way of a radial port 43 in the boost piston 4. The land 38 acts as an exhaust valve controlling communication between the reservoir chamber 8 and the annular chamber 40 by way of a second radial port 44 in the boost piston 4. The spool is urged into contact with the input piston 3 by a return spring 45 acting between a seating on the extension 29 of the output portion 25, and the forward end of the spool.

In the inoperative position shown, the inlet valve is closed, and the exhaust valve is open, so that the boost chamber 5 is in communication with the reservoir chamber 8. The high pressure in the chamber 6 acts over an effective area equal to the area of the seal 31 minus the area of the seal 33 to apply to the piston 4 a net force urging it rearwardly into a retracted position.

In operation, the pedal-operated input rod 21 acts to move the input piston 3 forwards. The spool 10 is also moved forwards against the spring 45, initially to cut off communication between the reservoir chamber 8 and the boost chamber 5. Further movement of the spool in the same direction establishes communication between the high pressure chamber 6 and the boost chamber 5, to allow high pressure fluid from the accumulator to pressurise the boost chamber 5. The boost piston 4 therefore moves forwards to actuate the master cylinder, after the friction in the seals 22, 31, 33 and 34 and the forces urging the boost piston rearwardly, have been overcome. Due to the low friction seals 31 and 33, seal friction is not excessive, despite the fact that accumulator pressure may be of the order of 150 bars. The pressure in the boost chamber 5 also acts on the input piston 3 through the spool 10, and is transmitted by the input rod 21 to provide a reaction at the pedal. Since there are no seals on the spool, this reaction is transmitted through the seal 22 only, which is subject to the relatively low reservoir pressure. Thus the hysteresial and frictional effects of the seal 22 on the reaction force are minimised.

When the reaction load on the spool exceeds slightly the applied load, the input piston 3 and the boost piston 4 move apart slightly due to the boost pressure, and the spool also moves rearwardly to close the inlet valve. The booster is thus balanced in its null position with both inlet and exhaust valves closed.

When the input force is reduced the input piston 3 and the spool 10 moves rearwardly, but the boost pressure keeps the boost piston 4 stationary. The land 38 re-establishes communication between the boost chamber 5 and the reservoir 8, and so the boost piston 4 moves rearwardly.

If accumulator pressure fails, the input piston 3 engages directly with the rearward end of the boost piston 4 to operate the boost piston and the master cylinder.

Figure 2:
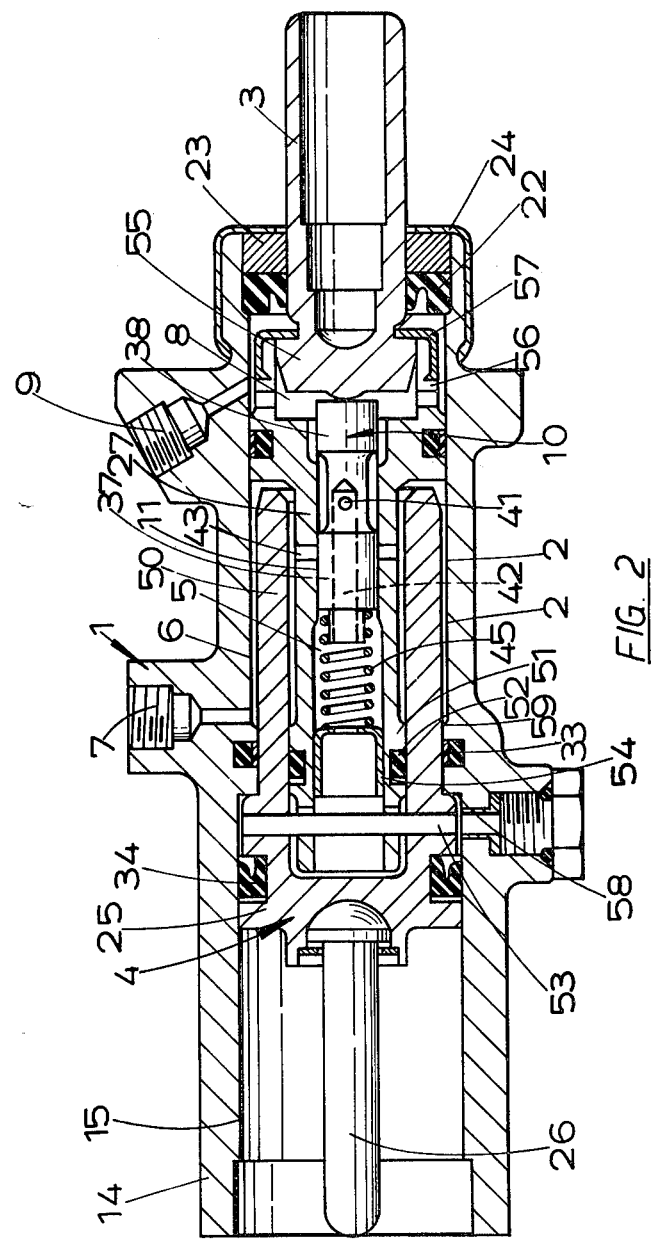
FIG. 2 is similar to FIG. 1 but showing some modifications.

The modified booster illustrated in FIG. 2 of the drawings is of simplified construction. The rod 26 is separate from the output portion 25 of the boost piston 4 and the output portion 25 has a rearwardly extending annular extension 50 which works through the seal 33. The control portion 27 projects into the extension 50 and includes an enlarged portion 51 having a seal 52 which seals with the interior of the extension 50. A radial pin 53 couples the extension 50 and the enlarged portion 51 together. The pin 53 is a press fit in the extension 50 and a clearance fit in the portion 51. This enables limited relative movement between the extension 50 and the portion 51 to take place in order that the control portion 27 can engage directly with the extension 50 in the event of failure of the high pressure source. The spring 45 abuts against an abutment member 54 in the form of a thimble which is housed in the enclosed portion of the bore 11.

The housing 1 is of one-piece construction. A shoulder forming an abutment for an enlargement of the inner end of the piston 3 is omitted and the enlargement 55 is received within an annular extension 56 at the adjacent end of the control portion 27 in which it is retained by a retainer 57. This enables the bore 2 to be produced by machining from opposite ends of the housing up to shoulders 58 and 59 at opposite ends of a radial projection provided with a groove in which the seal 33 is located.

The construction and operation of the booster of FIG. 2 is otherwise the same as that of FIG. 1 and corresponding reference numerals have been applied to corresponding parts.

Figure 3:
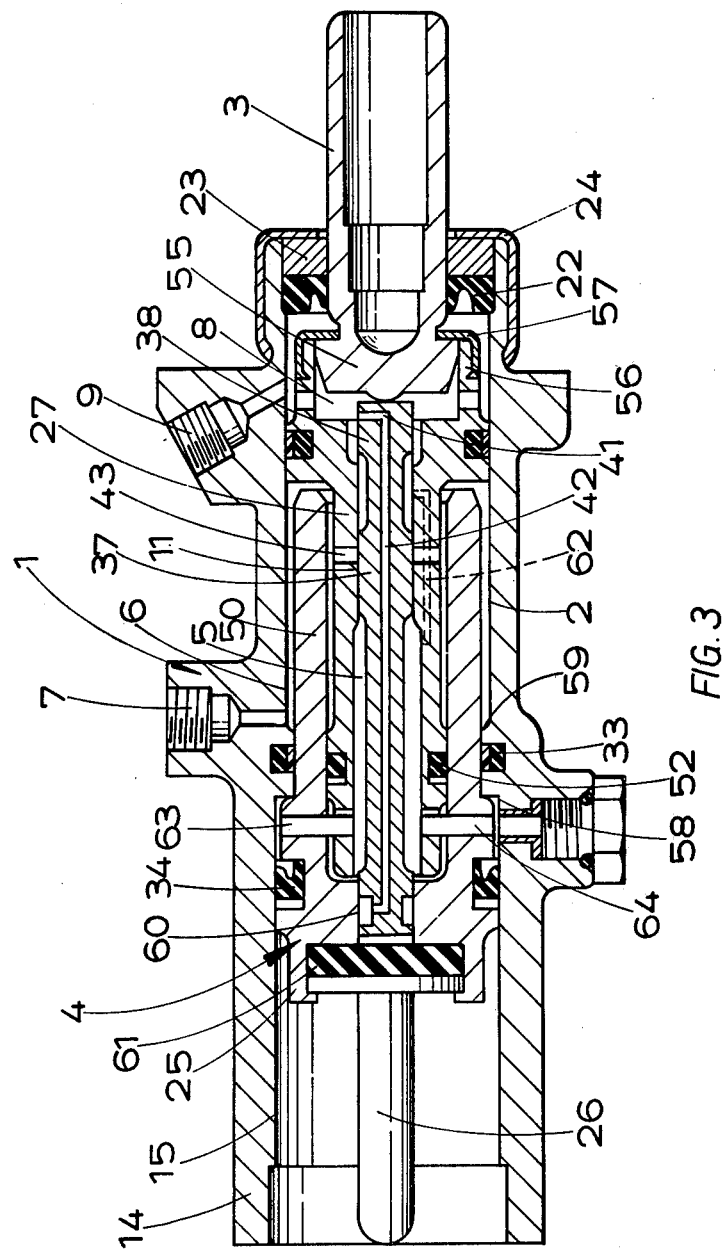
FIG. 3 is a longitudinal section through another booster.

In the booster illustrated in FIG. 3 of the drawings the spring 45 is omitted. The spool 10 is extended axially and is slidably guided at its outermost end in a through-bore 60 in the output portion 25 through which it projects to act on the output rod 26 through a reducer mechanism in the form of a plug 61 of resilient material which is retained at its outer edge in a recess in the output portion 25.

Chambers in the bore 11 on opposite sides of the land 37 are interconnected at all times by a longitudinal passage 62 in the control portion to equalise the pressures in these chambers.

The radial pin 53 is replaced by a pair of aligned radial pins 63 and 64.

In operation the boost pressure is applied to the master cylinder through the output rod 26 as described above.

The reaction of the load applied to the master cylinder acts in a reverse direction and is transmitted through the output rod 26 to the resilient plug 61. This deforms the plug 61 against the control valve 10. Thus a reduction of the load applied to the master cylinder is fed back to the brake pedal through the control valve 10 and the input piston 3, which engages with the spool, to provide a reaction or "feel". When the load on the control valve 10 exceeds slightly the applied load at the pedal the control valve 10 moves rearwardly until the inlet valve closes. In this position the booster is in its null position with both the inlet and exhaust valves closed. If the input force is reduced, the resilient plug 61 urges the control valve 10 rearwardly through a further distance. This opens or re-establishes communication to re-connect the boost chamber 5 to the reservoir.

In this construction the operator will be unaware of the magnitude of the boost pressure as the reaction felt at the pedal is a reduction of the load applied to the master cylinder assembly through the output rod 26. Thus variations in the boost pressure due to seal hysteresis are not felt at the pedal, and the apparent hysteresis is low.

In the event of failure of the high pressure supply the control valve 10 abuts the resilient plug 61 and, after a small displacement, the input load is transmitted directly to the output rod 26.

If the resilient plug 61 is of rubber it will act as a solid, non-deformable plug at extremely low temperatures of about −40° C. The booster is designed such that in the event of a brake application under these conditions the inlet valve is closed when the control valve 10 abuts the plug 61. Thus in this case when the control valve 10 is moved inwardly to open the inlet valve, the boost piston 4 also immediately moves in the same direction to close the inlet valve. As the input force cannot deform the rubber to open the valve, the master cylinder is applied without booster assistance. As the pedal is cycled the rubber will warm up and become operational again.

The construction and operation of the booster of FIG. 3 is otherwise the same as that of FIG. 2 and corresponding reference numerals have been applied to corresponding parts.

Figure 4:
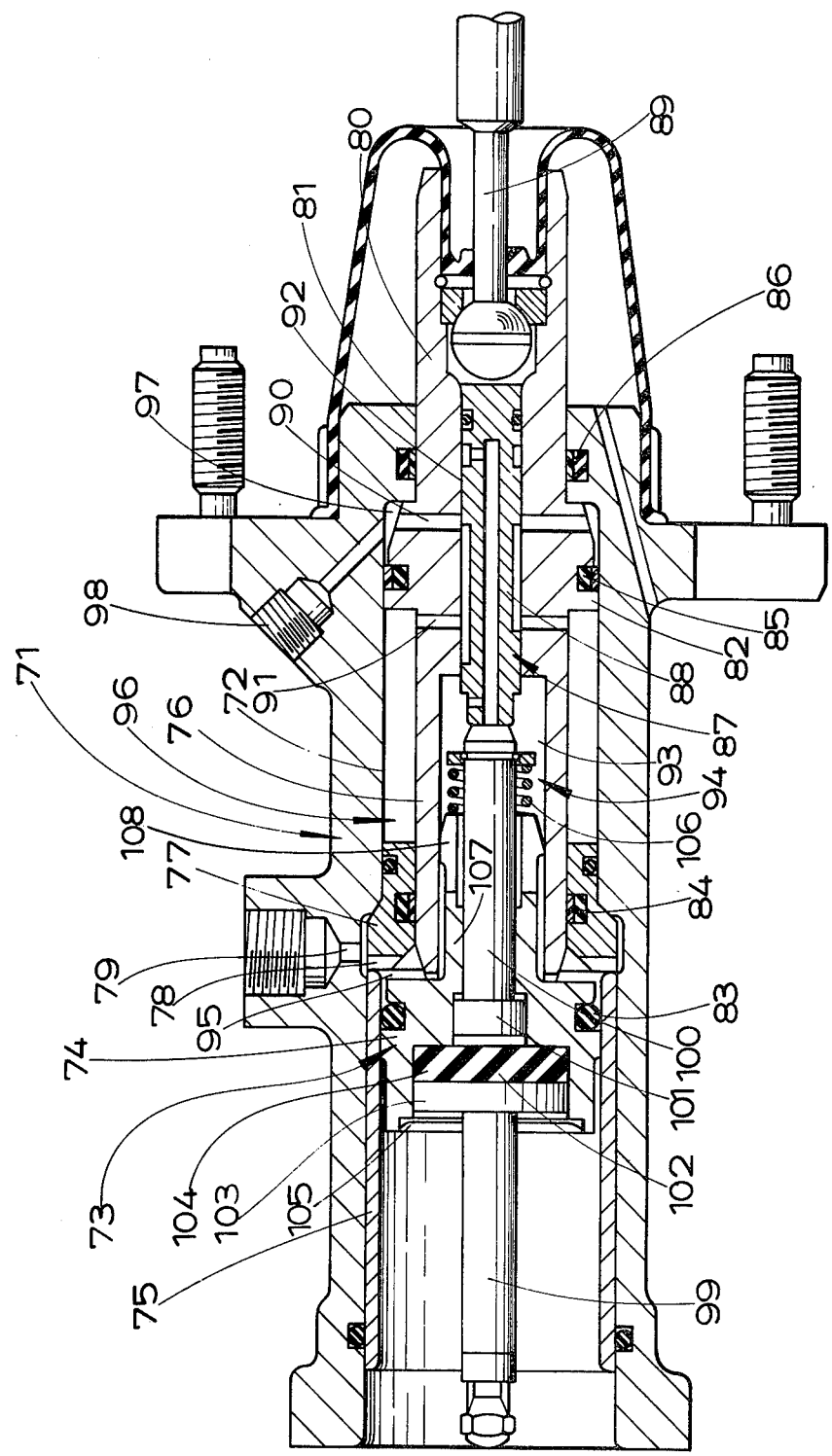
FIG. 4 is a longitudinal section through yet another booster.

The hydraulic power booster illustrated in FIG. 4 of the drawings comprises a housing 71 having a bore 72 in which works a boost piston 73 of stepped outline for operating a master cylinder assembly (not shown). The boost piston 73 has a forward portion 74 of greater diameter working in a sleeve 75 which is sealingly pressed into the open inner end of the bore 72, an intermediate portion 76 of smaller diameter and of substantial length and which works through a radial shoulder member 77 which is slotted radially at its inner end at 78 to communicate with a connection 79 to a reservoir for hydraulic fluid, a rear end portion 80 substantially of the same diameter as that of the portion 76 and working through a bore 81 at the other end of the housing 71, and a portion 82 between the portions 73 and 80 and substantially of the same diameter as that of the portion 74 of greater diameter. The forward portion 74 has a rearwardly directed extension 107 which is received in intermediate portion 76 and the extension 107 is slotted at 108 to provide it with a degree of resilience to facilitate a press fit in the portion 76 and to provide fluid communication between opposite ends of the extension 107.

The portion 74 carries a seal 83 sealing with the sleeve 75, the member 77 carries a seal 84 with which the intermediate portion 76 engages sealingly, the portion 82 carries a seal 85 sealing with the bore 72, and a seal 86 is housed in the wall of the bore 81 for sealing engagement by the rear portion 80.

A control valve assembly 87 is housed within the boost piston 73. The valve assembly 87 comprises a spool 88 which is operated from a pedal (not shown) through a push-rod 89. The spool 88 controls communication between communicating diametral passages 90, 91 in the piston 73 on opposite sides of the seal 85 which lead, at their inner ends, into a bore 92 in which the spool 88 works, and between the passage 91 and a chamber 93 in the piston 73 at the inner end of the bore 92 and in open communication at all times with the connection 79 through the slot 108.

In the retracted position shown a reservoir chamber 94, defined by the chamber 93 and an annular space 95 betwen the portion 74 and the member 77, is isolated from a first high pressure chamber 96, defined between the member 77 and the portion 82, and the chamber 96 is in communication with a second high pressure chamber 97 defined between the portion 82 and the adjacent end of the housing 71.

A high pressure source, suitably an hydraulic accumulator (not shown), is connected at all times to the second pressure space 97 through an inlet connection 98 so that, in the position shown, shoulders on opposite sides of the portion 82 are subjected to equal pressures.

At its forward end the spool 88 acts on an output member 99 through a push-rod 10 and, in the position shown, an enlarged head 101 at the forward end of the push-rod 100 is spaced from a rubber reaction block 102 of substantial diameter and against which abuts a superimposed head 103 of substantially equal area on the output member 99. The head 103 and the block 102 are both retained within a recess 104 in the boost piston 73 by means of a retainer 105. A spring 106 acts between the piston 73 and the push-rod 100 to hold the spool 88 in the retracted position shown.

When the areas of the shoulders on opposite sides of the portion 82 are equal, a light spring may be provided to hold the booster piston 73 in the retracted position shown. Otherwise the area of the portion 80 may be slightly greater than that part of the portion 76 which slides through the seal 84 so that the piston 73 is biassed into the retracted position shown by the effect of equal pressures acting over different areas.

When the pedal is operated to actuate the booster the spool 88 is advanced in its bore, initially to isolate the passage 90 from the passage 91 and thereby isolate the second high pressure chamber 97 from the first high pressure chamber 96.

Further movement of the spool 88 in the same direction places the first high pressure chamber 96 in communication with the reservoir chambers 95 to reduce the pressure in the chamber 96. The piston 73 is then advanced in the bore by the pressure fluid in the second high pressure chamber 97, to operate the master cylinder with a thrust transmitted to the output member 99 through the reaction block 102 and the head 103.

The reaction of the load applied to the master cylinder acts in a reverse direction and is transmitted through the output member 99 to the block 102. This deforms the block 102 against the push-rod 100. Thus a reduction of the load applied to the master cylinder is fed back to the brake pedal through the push-rod 100, the valve spool 88, and the push-rod 89 to provide a reaction or "feel".

When the load applied on the control valve assembly 87 exceeds slightly the load at the pedal the spool 88 moves relatively rearwardly until communication between the reservoir chamber 95 and the first high pressure chamber 96 is cut-off. In this position the booster is in its null position with the three chambers 95, 96 and 97 isolated from each other.

If the input force is reduced the reaction block 102 urges the spool 88 rearwardly through a further distance. This re-establishes communication between the two chambers 96 and 97.

In the event of failure of the pressure source, after taking up a clearance, the head 101 abuts the block 102 and, after a small displacement, the input load is transmitted to the output rod 99.

I claim:

1. A pedal-operated hydraulic power booster for a vehicle hydraulic system comprising a pedal, a housing having an inlet port for connection to a source of hydraulic fluid under pressure, an exhaust port for connection to a reservoir for hydraulic fluid, a stepped bore having axially spaced first, second and third portions, said first and second portions being of different diameter, a boost piston of stepped outline for actuating a master cylinder assembly, said boost piston having first, second and third portions of at last two different diameters working in said first, second and third portions of said bore respectively, said second portion of said piston being of smallest diameter, and said first and third portions of said piston being arranged at opposite ends of said second portion of said piston, a seal carried by said first portion of said piston for slidable sealing engagement with said first portion of said bore, a seal in said housing located in said second portion of said bore and in which said second portion of said piston has a slidable sealing engagement, a seal carried by said third portion of said piston for slidable sealing engagement in said third portion of said bore, said first portions being disposed closer than said second portions to said pedal, means defining in said housing a first high pressure chamber through which hydraulic fluid is applied to said boost piston, means defining in said housing a second high pressure chamber communicating with said inlet port, means defining in said housing a reservoir chamber communicating with said exhaust port, and a control valve operable in response to an effort applied to said pedal for controlling communication between said first and second high pressure chambers and between said first high pressure chamber and said reservoir chamber, said first high pressure chamber being defined at least in part between said first portion of said piston and a shoulder at a first step between said first portion of said bore and said second portion of said bore, said reservoir chamber being defined at last in part between said third portion of said piston and a shoulder at a second step between said second portion of said bore and said third portion of said bore in which the said third portion of said piston works, and said second high pressure chamber being defined between said second portion of said piston and the end of said bore which is remote from said master cylinder.

2. A booster as claimed in claim 1, wherein said piston is movable between an inoperative retracted position and an operative position and said piston is provided with a first pressure responsive region and a second pressure responsive region, and wherein said three chambers are so constructed and arranged in said housing, between said bore and said boost piston, that in said inoperative position with said source of hydraulic pressure fluid operative the high pressure fluid acts over said first region to subject said piston to a force urging said piston into said retracted position and in said operative position said high pressure fluid acts over said second region to subject said piston to a force urging said piston into said operative position.

3. A booster as claimed in claim 2, wherein one of said regions comprises a face on said piston at a change in diameter.

4. A booster as claimed in claim 2, wherein one of said regions is constituted by the difference in area between oppositely arranged faces of different area of said piston which are subjected to equal pressures.

5. A booster as claimed in claim 1, wherein said reservoir chamber is located at the forward end of said housing adjacent to said master cylinder, said second high pressure chamber is located at the rear end of said housing, and said first high pressure chamber is located between them.

6. A booster as claimed in claim 1, wherein said piston comprises at least two separate parts, and means for coupling said parts together against relative axial movement.

* * * * *